(12) United States Patent
Ginosar

(10) Patent No.: US 6,931,474 B1
(45) Date of Patent: Aug. 16, 2005

(54) DUAL-FUNCTION COMPUTING SYSTEM HAVING INSTANT-ON MODE OF OPERATION

(75) Inventor: Ran Ginosar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/404,486

(22) Filed: Sep. 23, 1999

(51) Int. Cl.$^7$ .............................................. G06F 13/00
(52) U.S. Cl. ..................... 710/316; 710/306; 710/36; 710/41; 710/16; 710/302
(58) Field of Search ....................... 710/305–306, 710/300–304, 315–316, 105–106, 36–41, 15–17, 62–64, 313, 2, 3, 72, 73, 74, 20, 21; 361/58, 686; 713/2, 100

(56) References Cited

U.S. PATENT DOCUMENTS

| | | | |
|---|---|---|---|
| 4,679,166 A | | 7/1987 | Berger et al. |
| 4,703,419 A | * | 10/1987 | Krause et al. ............... 709/200 |
| 5,247,366 A | | 9/1993 | Ginosar et al. ............. 258/209 |
| 5,384,692 A | | 1/1995 | Jaff |
| 5,394,524 A | | 2/1995 | DiNicola et al. |
| 5,452,454 A | * | 9/1995 | Basu .............................. 713/2 |
| 5,497,339 A | * | 3/1996 | Bernard .................. 364/705.05 |
| 5,511,205 A | | 4/1996 | Kannan et al. |
| 5,671,374 A | * | 9/1997 | Postman et al. ............ 710/305 |
| 5,774,686 A | * | 6/1998 | Hammond et al. ......... 712/209 |
| 5,805,833 A | * | 9/1998 | Verdun ........................ 710/300 |
| 5,859,628 A | * | 1/1999 | Ross et al. ................... 345/173 |
| 5,982,614 A | * | 11/1999 | Reid ........................... 361/686 |
| 5,999,997 A | * | 12/1999 | Pipes .......................... 710/300 |
| 6,021,452 A | | 2/2000 | Birch et al. |
| 6,026,465 A | | 2/2000 | Millis et al. |
| 6,058,089 A | | 5/2000 | Youens et al. |
| 6,098,138 A | * | 8/2000 | Martinelli et al. .......... 710/313 |
| 6,106,565 A | | 8/2000 | Stapleton et al. |
| 6,266,711 B1 | * | 7/2001 | Ishikawa et al. ............... 710/8 |
| 6,327,613 B1 | * | 12/2001 | Goshey et al. .............. 709/208 |
| 6,510,524 B1 | * | 1/2003 | Osborn et al. .............. 713/323 |
| 6,523,073 B1 | * | 2/2003 | Kammer et al. .............. 710/49 |
| 6,523,079 B2 | * | 2/2003 | Kikinis et al. .............. 710/303 |

* cited by examiner

*Primary Examiner*—Paul R. Myers
*Assistant Examiner*—Raymond N Phan
(74) *Attorney, Agent, or Firm*—James S. Finn

(57) ABSTRACT

A single, dual form computing device is provided that incorporates the functionality of a laptop computer with that of a handheld or palm-size computing device, and allows each functionality to be selectively employed. The dual form computing device operates in one of two modes. While operating in a first "instant on" mode, the dual form computing device provides functionality similar to that of a handheld device, whereby a lengthy bootstrap process and operating system load is not required. While operating in a second "non-instant on" mode, the dual form computing device operates substantially like a laptop computer. Additionally, the dual form computing device is equipped to share input and output devices independent of the operation mode it functions in.

8 Claims, 8 Drawing Sheets

DUAL-FUNCTION COMPUTING SYSTEM HAVING INSTANT-ON MODE OF OPERATION

CROSS-REFERENCE TO RELATED APPLICATION

This application is a Continuation-In-Part patent application entitled "A Dual-Form Low Pow On Computing Device," filed Sep. 21, 1999.

BACKGROUND OF THE INVENTION

1. Field of the Invention

The present invention relates to the field of computing in general and, in particular, to a dual form low power/instant on and high performance/non-instant on computing device.

2. Background Information

Desktop computing devices have typically provided the most processing power and largest data storage capabilities available on the market for the least amount of money. At least, that is true when compared to other computing devices such as laptop or notebook computers. It has only been recently, with the proliferation of low cost computing components such as processors, memory, and magnetic storage devices, however, that laptop computers have been able to approach the price versus performance barrier that desktop computers have traditionally defined. The slightly higher price that an equivalently equipped laptop computer demands over its desktop counterpart is considered by some to be an acceptable tradeoff when such factors as portability are factored in.

Unfortunately, price is sometimes less of a concern than expected battery life when it comes to potential laptop purchasers. Today, the average battery life expectancy for a laptop computer tends to be only 2 to 4 hours, thereby limiting the time and distance one may travel without recharging the battery. Additionally, the battery life expectancy of a laptop tends to be inversely proportional to the number of peripheral devices, such as CD/DVD-ROM drives, MODEMS, ard various PC cards connected to the laptop. As the number of peripheral devices connected to the laptop increases, the resulting battery life of the laptop can be expected to decrease.

Most recently, a new genre of low power portable computing devices have entered the market. These portable devices, sometimes referred to as handhelds, or palm-size computers, are typically smaller and more lightweight than laptop computers, have a battery life expectancy that far surpasses that of laptops, and provide "instant on" across to programs and data, rather than requiring an extended operating system load time upon startup as do laptops. Typically, when these handheld devices are powered-on, a microprocessor contained within the device immediately begins to execute operating system instructions and applications stored within a read only memory (ROM) and/or random access memory (RAM) device. Since these instructions do not need to be loaded from a relatively slow data storage device, such as a hard disk drive, prior to execution by the microprocessor, startup time is decreased and battery life increased. Unfortunately, however, as convenient as these handheld devices may seem, they do have some drawbacks.

Whereas desktop and laptop computers provide an abundance of data storage space, handheld devices remain limited in the amount of data that may be stored within the device. External data transfer cables may be used to transfer data between a handheld computing device and an external data storage device, however, such transfer mechanisms tend to be awkward and time consuming. Similarly, handheld devices typically require specially compiled versions of applications software and operating systems that may only provide limited functionality as compared to a version generally available for laptops, e.g. Microsoft WINDOWS CE vs. WINDOWS 98.

Additionally, because of their reduced size, handheld devices typically contain smaller video displays as compared to laptops, and such displays may or may rot provide color display capability. Furthermore, not all handheld devices contain keyboards, and those that do, often implement reduced size micro-keyboards or keypads, rather than the larger size keyboards available on most laptops.

Some users have the need for both a low power handheld computing device as well as a high performance laptop computer depending upon their particular circumstances. For example, when travelling in an airplane, a person may prefer to use a handheld computing device due to the long battery life. Likewise, a person may prefer to use a handheld computing device during a business meeting, where the use of a laptop computer may not be convenient. On the other hard, a high performance laptop computer may be preferable in situations where a user may have a large amount of data to input and has access to a power outlet. For example, a business person may use a laptop as their office computer, but may also choose to use a handheld computing device for use during travel and/or meetings. Such a user is therefore burdened with both the cost and inconvenience of two devices.

Therefore, what is needed is a single portable computing device that incorporates the advantages of both laptops and handheld devices, while overcoming the limitations of each found within the prior art.

SUMMARY OF THE INVENTION

An apparatus is provided with a first plurality of electronic components defining an instant on computing device for use in a first instant on mode of operation. The apparatus is further provided with a second plurality of electronic components, including a plurality of input and output devices defining a non-instant on computing device for use in a second non-instant on mode of operation. The apparatus is further provided with one or more switching mechanisms coupled to the input and output devices and to selected ones of the first and second plurality of electronic components to enable the input and output devices to be available for use in the first instant on, as well as the second non-instant on modes of operation.

In one embodiment, the first plurality of components define a hand-held computing device, such as a palm-top computer, while the second plurality of components define a laptop computer, which has a receptacle that receives the hand-held device. When the hand-held device is inserted into the receptacle, the one or more switching mechanisms make the input and output devices of the laptop computer available to the hand-held device for use in the instant on mode. When the hand-held device is not in the receptacle, however, it operates normally, using its own display and user input device.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A dual form instant on and non-instant on computing device is disclosed. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
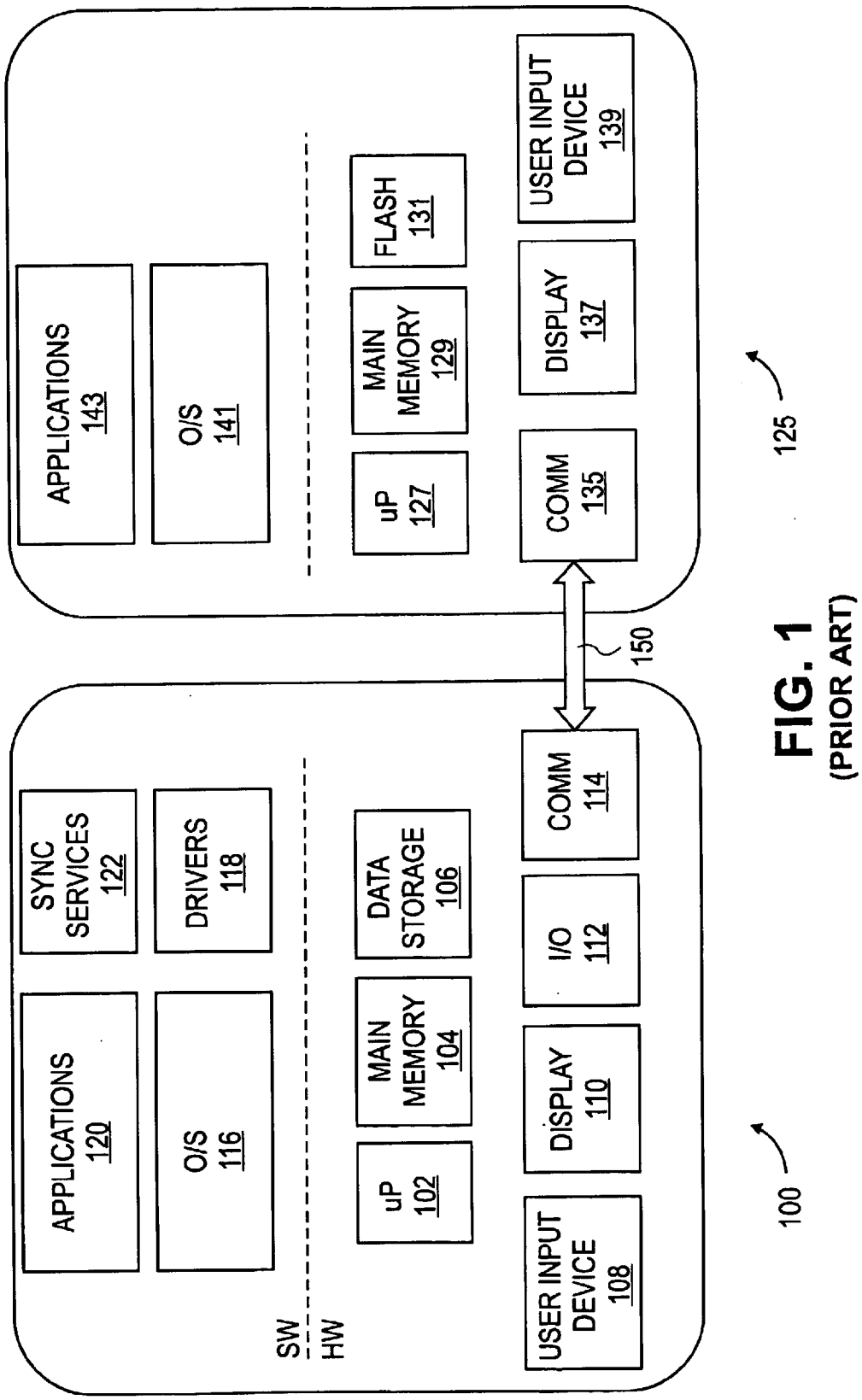
FIG. 1 is an architectural block diagram illustrating a conventional handheld computing device connected to a conventional laptop computer.

FIG. 1 is a block diagram illustrating a conventional handheld computing device connected to a conventional laptop computer. Referring to FIG. 1, laptop computer 100 represents a general purpose portable computing device including microprocessor 102, main memory 104, data storage device 106, user input device 108, display device 110, input/output port 112, and communication device 114.

Microprocessor 102 represents various processors known in the art to process data signals. Main memory 104 represents a volatile data storage device, such as dynamic random access memory (DRAM), that stores instructions and/or data to be processed by microprocessor 102. Data storage device 106 represents a non-volatile data storage device, such as a disk drive, CD-ROM, equipped to store large amounts of data for an extended period of time.

User input device 108 represents a "full function" or "full size" input device, such as a "full size" keyboard, mouse, or trackball that is equipped to convert user input into electronic data signals to be processed by microprocessor 102. Display device 110 represents a "full size" video display device, such as a 15" thin film transistor (TFT), active matrix or the like, for displaying information to a user. Communication device 114 represents an input/output communications device equipped to transfer data to and from laptop computer 100, such as a parallel interface, and I/O 112 represents additional input and output ports also equipped to transmit data to and from laptop computer 100.

In a conventional laptop boot sequence, laptop computer 100 will typically perform a power-on self test (POST) when power is applied. The POST routine comprises code typically stored in a non-volatile memory such as ROM (not shown) that verifies the integrity and configuration of laptop computer 100. Once the POST routine has completed successfully, laptop computer 100 begins to load operating system 116 from data storage device 106 into main memory 104 to be executed by microprocessor 102. Operating system 116 comprises instructions that when processed by microprocessor 102, manages the resources of laptop computer 100 enabling it to function in a conventional manner. As operating system 116 is loaded, various device drivers 118 may also be loaded. Device drivers 118 represent various instructions and data that when executed, facilitate access to the corresponding devices by operating system 116 and applications 120. Once operating system 116 and device drivers 118 (if any) have been loaded and executed, applications 120 may also be loaded and executed.

Handheld computing device 125 is shown coupled to laptop computer 100 by external cable 150. Handheld computing device 125 represents a handheld or palm-sized, limited function computing device, and includes microprocessor 127, main memory 129, flash memory 131, communication device 135, display device 137, user input device 139, operating system 141, and applications 143.

Microprocessor 127 represents various processors known in the art to process data signals. Main memory 129 and flash memory 131 each represent memory storage devices that store instructions and/or data that may be executed by microprocessor 127. Main memory 129 may comprise volatile RAM and/or nonvolatile ROM, whereas flash memory 131 may comprise a nonvolatile memory device that can be erased and reprogrammed.

Communication device 135 represents an input/output communications device equipped to transfer data to and from handheld computing device 125, such as a parallel interface. User input device 139 represents an input device, such as a stylus or reduced size keyboard, that is equipped to convert user input into electronic data signals to be processed by microprocessor 127. Display device 137 represents a small display device, such as a 4" liquid crystal display (LCD), for displaying data to a user.

In addition to various hardware components, handheld computing device 125 also contains various software components including operating system 141 and applications 143. Operating system 141 comprises instructions that when processed by microprocessor 127, manage the resources of computing device 125 to function in a conventional manner. Operating system 141 represents any one of the various operating systems available for use with handheld computing device 125, including for example, WINDOWS CE™ from Microsoft Corporation of Redmond, Wash. Operating system 141 provides system services for applications 143 to access the various hardware components described above.

Applications 143 may include various utility and data processing software programs that have been specially designed for handheld computing device 125, or have been recompiled to function with microprocessor 127. Often, applications 143 represent pared-down versions of application software commonly available for full-sized computing devices. Such pared-down, "light" or "pocket" versions typically contain only a subset of the functions available in the larger, more ubiquitous versions of the software. Both applications 143 and operating system 141 may reside in flash memory 131 and/or main memory 129 to be executed in place by microprocessor 127.

When operating conventionally, handheld computing device 125 functions in a low power, "instant on" manner, whereby when it is powered-on, microprocessor 127 executes instructions representing operating system 141 and applications 143 directly from main memory 129 and flash memory 131. In such a manner, handheld computing device 125 is able to bypass a long bootstrap and operating system load by executing operating instructions in place rather than loading the instructions into RAM from a comparatively slow data storage device, such as data storage device 106, prior to execution. In addition, handheld computing device 125 is able to bypass a long bootstrap and operating system load partially because operating system 141 contains only a small portion of the code typically contained within operating systems used by larger, more robust, and more complex computing devices, such as laptop computer 100.

Additionally, when operating conventionally, handheld computing device 125 also functions in a low power mode, whereby microprocessor 127 operates at low frequency and supply voltage levels, executes a simple operating system that does not incur heavy overhead, and employs and powers only a limited set of peripheral I/O devices. In comparison, laptop computer 100 operates under greater power requirements, but may also achieve greater performance due to a higher operational frequency and voltage, in addition to executing a more complicated operating system.

Once handheld computing device 125 is powered-on and functioning under operating system 141, a user may input and store data in main memory 129, for example, using applications 143 and user input device 139. Data stored within handheld computing device 125 may be accessed using applications 143, or transferred to another device, such as laptop computer 100, through external cable 150. Similarly, data may be transferred from a device such as laptop computer 100, to handheld computing device 125 via external cable 150. External cable 150 represents a detachable general purpose transfer cable, such as a RS-232 based serial cable.

In addition to data transfer, laptop computer 100 and handheld computing device 125 may also be equipped to perform data synchronization using external cable 150. Data synchronization is a process whereby one or more data files residing on one device are compared to, and if needed, updated to conform with, one or more data files residing on a second device. Sync services 122 represents various synchronization applications that enable such data synchronization between devices.

Figure 2:
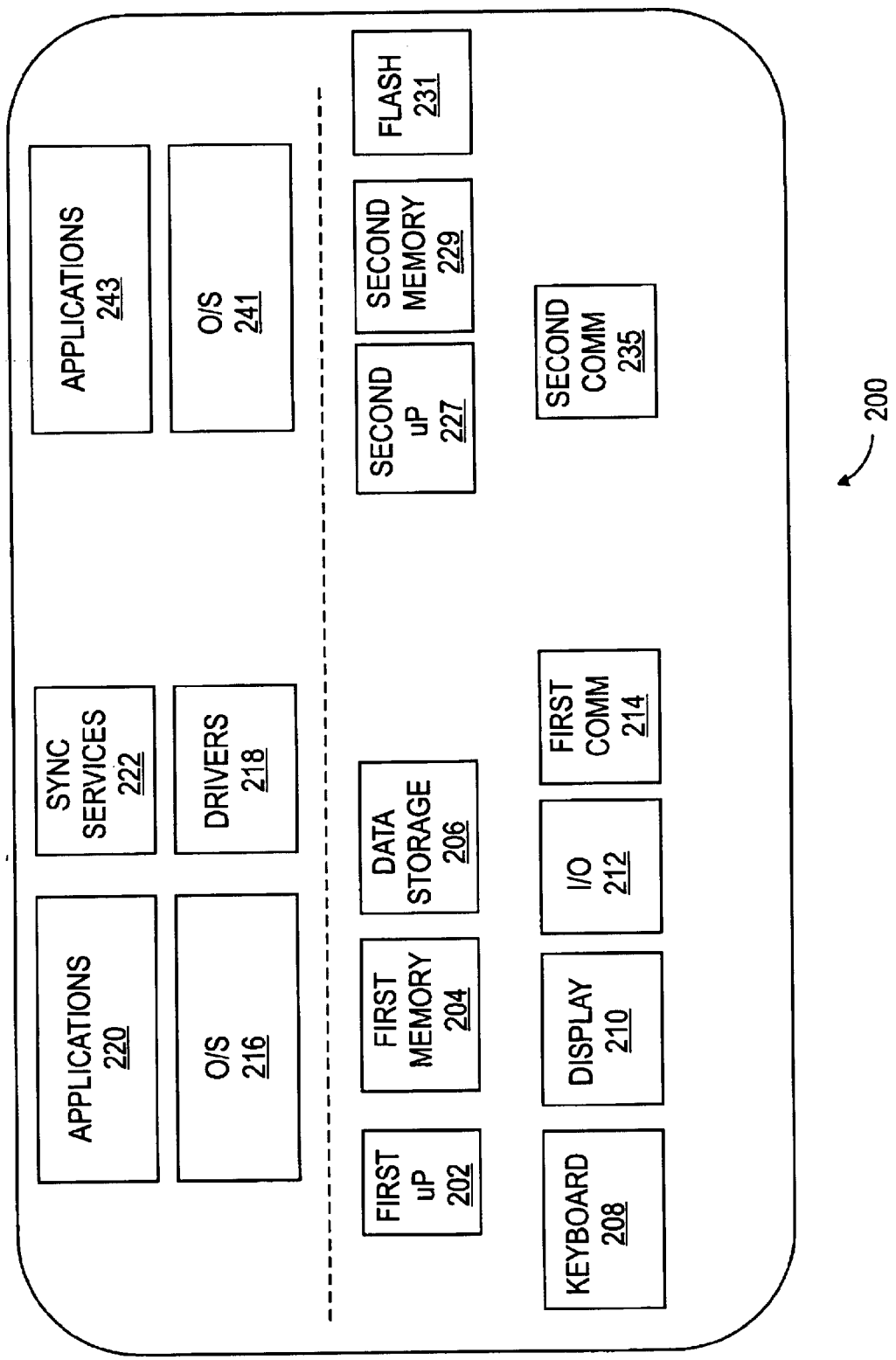
FIG. 2 is a block diagram illustrating a dual form computing device architecture according to one embodiment of the present invention.

FIG. 2 is a block diagram illustrating a dual form computing device architecture according to one embodiment of the present invention. Referring to FIG. 2, dual form computing device 200 represents a single computing device that incorporates the functionality of laptop computer 100 with that of handheld computing device 125, and allows each functionality to be selectively employed. Dual form computing device 200 operates in one of two modes, a low power, "instant on" mode and a high performance, "non-instant on" mode. In the first low power, "instant-on" operational mode, dual form computing device 200 provides instant-on functionality similar to that of handheld computing device 125, whereby a lengthy bootstrap process and operating systems load is not required. Unlike handhold computing device 125, however, while dual form computing device 200 is in the instant-on operational mode, a "full size" keyboard device and "full size" display screen, both similar to that of laptop computer 100 may be utilized. In the second high performance, "non-instant on" operational mode, dual form computing device 200 functions substantially similar to laptop computer 100.

Referring again to FIG. 2, dual form computing device 200 includes first microprocessor 202, first memory 204, data storage device 206, keyboard 208, display device 210, I/O 212, and first communication device 214. First microprocessor 202 represents one or more a general purpose processors known in the art to process data signals. In one embodiment of the present invention, microprocessor 202 represents a processor belonging to the PENTIUM® family of processors available from Intel Corporation of Santa Clara, Calif.

First memory 204 represents a volatile data storage device that may store instructions and/or data to be executed by microprocessor 202. Examples of such volatile data storage devices include for example, random access memory (RAM), dynamic random access memory (DRAM), synchronous dynamic random access memory (SDRAM), and the like, available from any one of a number of semiconductor manufacturers, such as Micron Inc., of Boise, Id. Additionally, dual form computing device 280 may also contain a read-only memory device (nor shown), such as a programmable read-only memory (PROM) or an electronically erasable programmable read-only memory (EEPROM) equipped to store instructions and/or data to be executed by microprocessor 202. Data storage device 206 represents a non-volatile data storage device equipped to store large amounts of data that is accessible by microprocessor 202. Data storage device 206 may include, for example, a hard disk drive, CD-ROM, DVD-ROM, DVD-RPM, DVD-R/w and the like.

Keyboard 208 represents a "full size" alphanumeric input device, while display device 210 represents any "full size" video display device known in the art to display digital data, such as for example, a 15" TFT or active matrix. In ore embodiment, display device 210 comprises a touchscreen, whereby a user may input data into dual form computing device 200 by touching or "tapping" the touchscreen with a stylus or similar object. Dual form computing device 200 may also contain other input devices including a mouse, trackball, and touchpad. Additionally, dual form computing device 200 also includes first communication device 214 and second communication device 235. Both first and second communication devices represent input/output communication devices equipped to transfer data within dual form computing device 200. I/O 112, however, represents input and output ports equipped to transmit data to ard from devices external to dual form computing device 200.

First operating system 216 may represent any one of the various operating systems known in the art to function with first microprocessor 202. In one embodiment, first operating system 216 is the WINDOWS®-98 operating system available from Microsoft Corporation. In one embodiment, applications 220 represent one or more WINDOWS® 98-based application programs equipped to function under first operating system 216. Sync services 222 represents a set of services equipped to provide interoperability between first operating system 216 and second operating system 241. In one embodiment, Sync services 222 represents the CE services available from Microsoft to sync between a WINDOWS-98 device and a WINDOWS CE device.

Dual form computing device 200 also includes second microprocessor 227, second memory 229, and flash memory 231. Second microprocessor 227 represents a processor known in the art to process data signals. In one embodiment, second microprocessor 227 is a MIPS processor, available from MIPS, Inc., of Milpitas, Calif.

Second memory 229 and flash memory 231 each represents memory storage devices that store instructions and/or data that may be executed by second microprocessor 227. Second memory 229 may comprise nonvolatile read-only memory (ROM) and/or volatile random access memory (RAM) that may be coupled to a power supply, such as a battery or capacitor (neither shown), to retain stored data after power is removed from dual form computing device 200. Flash memory 231 may comprise a nonvolatile memory device that can be erased and reprogrammed.

Second operating system 241 represents any one of the various operating systems available for use with dual form computing device 200 having second microprocessor 227. In one embodiment, second operating system 241 comprises the WINDOWS CE™ operating system available from Microsoft Corporation. In another embodiments, second operating system 241 may comprise various other operating systems including PALMOS™ from 3COM Corporation, and EPOC™ from Psion Software Inc.

In one embodiment of the present invention, dual form computing device 200 determines the proper operational mode within which to function, based upon hardware settings detected at startup. In one embodiment, dual form computing device 200 determines the proper operational mode based upon settings indicated by one or more switching mechanisms (discussed more fully below). In another embodiment, dual form computing device 200 may determine the operational mode within which to function based upon various software settings.

The startup process that dual form computing device 200 follows depends upon which of its operational modes is selected. In one embodiment, if an instant-on operational mode is selected, dual form computing device 200 follows a startup process similar to that described above with respect to handheld computing device 12. That is, when dual form computing device 200 is powered-on, second microprocessor 227 immediately processes instructions representing operating system 241 stored within second memory 229 and flash memory 231. A user may immediately input and store data in second memory 229 using WINDOWS CE based applications 243 and full-size keyboard 208. In addition, WINDOWS CE applications 243 and various other data may be viewed on "full size" video display device 210. Such advantages are not available in the two device approach of the prior art.

If, on the other hand, dual form computing device 200 detects that a non-instant on operational mode is selected, dual form computing device 200 follows a startup process similar to that described above with respect to laptop computer 100. That is, after a successful POST, dual form computing device 200 loads operating system 216 from data storage device 206 into first memory 204 to be executed by first microprocessor 202. As operating system 216 is loaded, device drivers 218 may also be loaded. Once operating system 216 and device drivers 218 (if any) have been loaded and executed, various WINDOWS® based applications 220 may also load and execute. Thus, dual form computing device 200 preserves the advantages of laptop computers while it offers the advantages of handheld computing.

In one embodiment, in addition to first microprocessor 202 functioning while dual form computing device 200 is in the non-instant on operational mode, second microprocessor 227 also functions. With both microprocessors functioning, dual form computing device 200 may automatically synchronize data stored within data storage device 206 and second memory 229. In such a manner, data previously stored while dual form computing device 200 was functioning in instant on operational mode becomes accessible when dual form computing device 200 functions in the non-instant on operational mode. In one embodiment, data synchronization occurs through an internal serial communications link between first communication device 214 and second communication device 235. In another embodiment, data synchronization may occur through a dedicated data transfer bus within dual form computing device 200.

Figure 3:
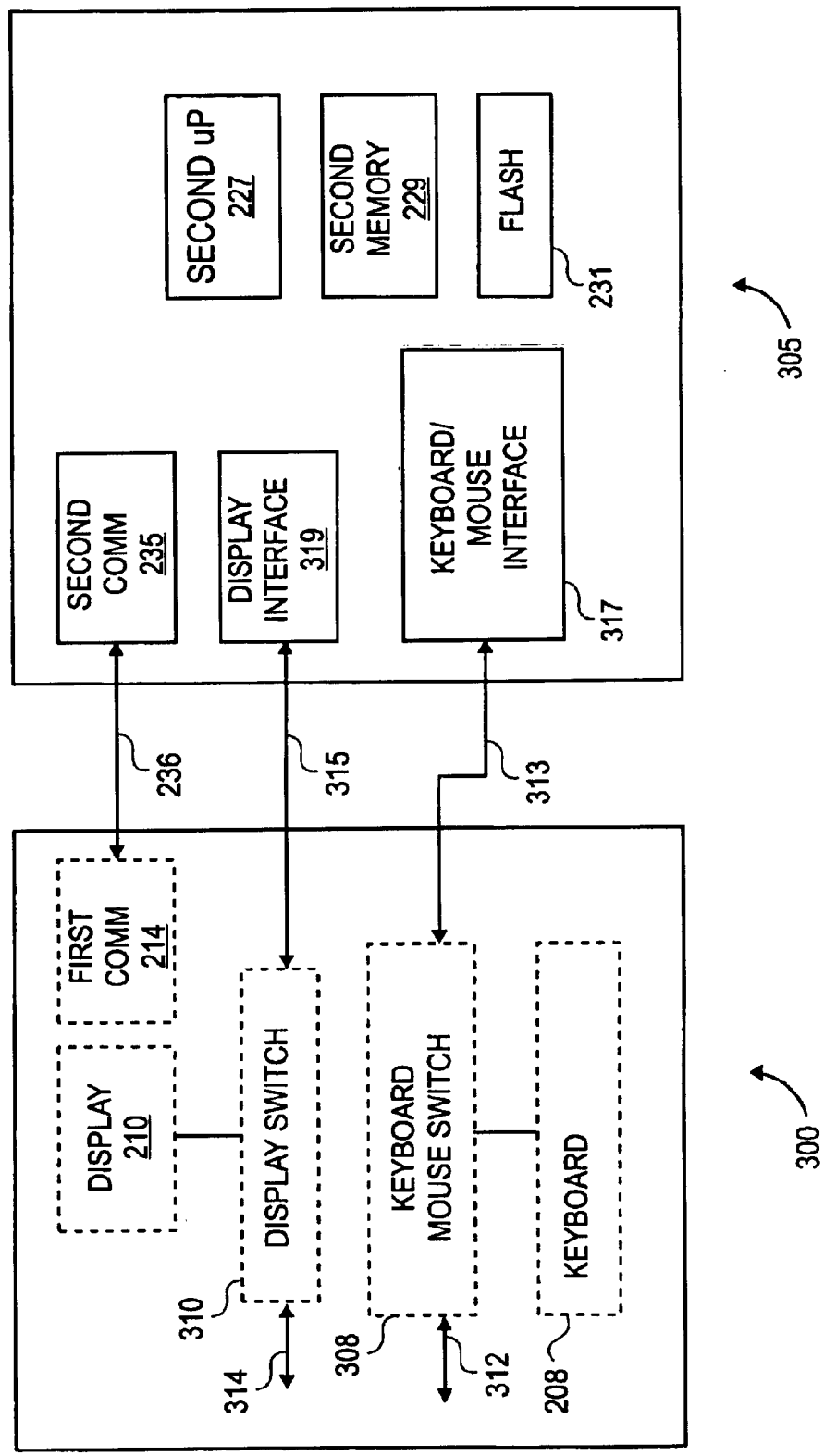
FIG. 3 is a block diagram illustrating an add-on card implementation of a dual form computing device according to one embodiment of the present invention.

In one embodiment of the present invention, dual form computing device 200 may be implemented through a conventional laptop that has been slightly modified to accept a WINDOWS CE-based add-on card of the present invention. FIG. 3 is a block diagram illustrating an add-on card implementation of a dual form computing device according to one embodiment of the present invention. Referring to FIG. 3, laptop computer 300 is shown comprising previously described "full size" display device 210, "full size" keyboard 208, and first communications device 214. Likewise, add-on card 305 is shown comprising previously described second communication device 235, second microprocessor 227, second memory 229, and flash memory 231. In one embodiment, first communication device 214 and second communication device 235 are connected by data transfer line 236.

In addition to the previously described components, add-on card 305 also includes display interface 319 and keyboard/mouse interface 317. Similarly, laptop computer 300 additionally includes keyboard/mouse switch 308 and display switch 310. Keyboard/mouse switch 308 comprises a mechanism whereby signal data from keyboard 208 may be selectively routed to components within laptop computer 300 via signal line 312, or to components of add-on card 305 via signal line 313 and keyboard/mouse interface 317. Likewise, data signals ray be routed from components of laptop computer 300, and components of add-on card 305 to keyboard 208 by way of signal lines 312 and 313 respectively, and keyboard & mouse switch 308. In one embodiment, keyboard & mouse switch 308 comprises one of a number of mechanical or electronic switches known in the art such as, for example, a toggle switch, a debounced push-button switch, or a programmable multiplexor.

Display switch 310 also comprises a mechanism whereby video display signal data may be selectively routed from multiple devices. Depending upon the setting of display switch 310, data may be routed to display device 210 from other electronic components of laptop computing device 300 or components of add-on card 305. Data routed from components of laptop computing device 300 passes over signal line 314, through display switch 310 and into display device 210. Data routed from components of add-on card 305 passes through display interface 319, over signal lisle 315, though display switch 310 and into display device 210. In one embodiment, display interface 319 and keyboard/mouse interface 317 are detachably coupled to laptop computer 300. In a case where display device 210 is equipped with a touchscreen for example, data flow may be reversed, whereby data may be selectively routed from display device 210 to either components of laptop computer 300 or components of add-in card 305 through display switch 310. In one embodiment, display switch 310 comprises one of a number of mechanical or electronic switches known in the art such as, for example, a toggle switch, a debounced push-button switch, or a programmable multiplexor. In a further embodiment, at least one of display switch 310 and keyboard & mouse switch 308 may be implemented via software.

Figure 4:
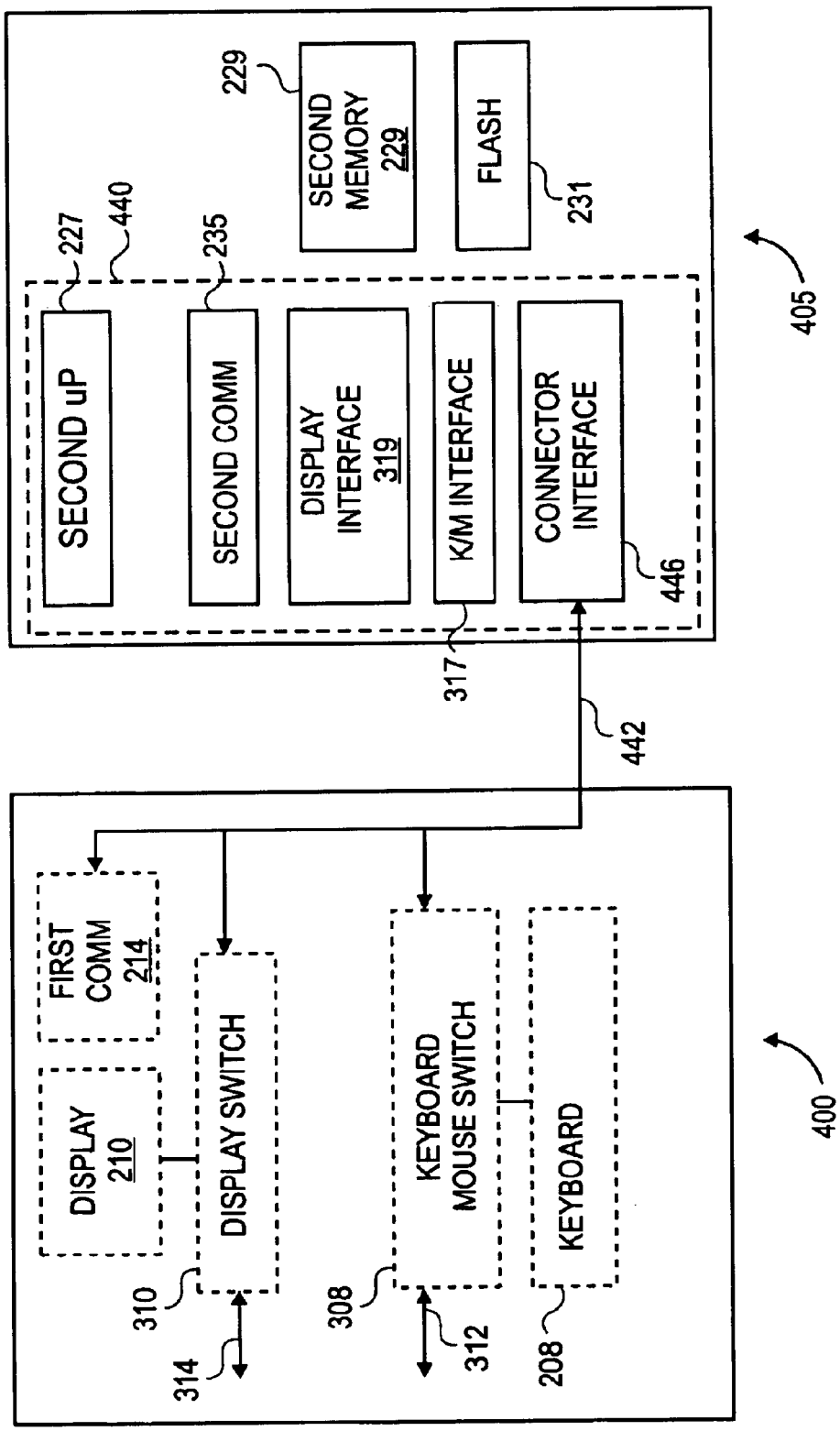
FIG. 4 is a block diagram illustrating a system-on-a-chip implementation of a dual form computing device according to one embodiment of the present invention.

In another embodiment of the present invention, much of the functionality described above with respect to add-on card 305 is incorporated into a single integrated circuit. FIG. 4 is a block diagram illustrating a system-on-a-chip implementation of a dual form computing device according to one embodiment of the present invention. Referring to FIG. 4, add-on card 405 is shown including previously described flash memory 231 and second memory 229, as well as IC 440 of the present invention. IC 440 represents an integrated circuit manufactured according to methods known in the art. Integrated circuit 440 combines the functional aspects of second microprocessor 227, second communication device 235, display interface 319, and keyboard/mouse interface 317 within a single chip. Additionally, IC 440 also comprises connector interface 446. Connector interface 446 enables add-on card 405 to communicate with another device, such as laptop computer 400, through a single data connection. Connector 442 represents any connector equipped to transmit data between add-on card 405 and laptop computer 40. In one embodiment, connector 442 is a cable that may be releasably coupled to add-on card 405 through connector interface 446. In another embodiment, connector 442 may represent one or more signal traces between add-on card 405 and laptop computer 400.

Figure 5:
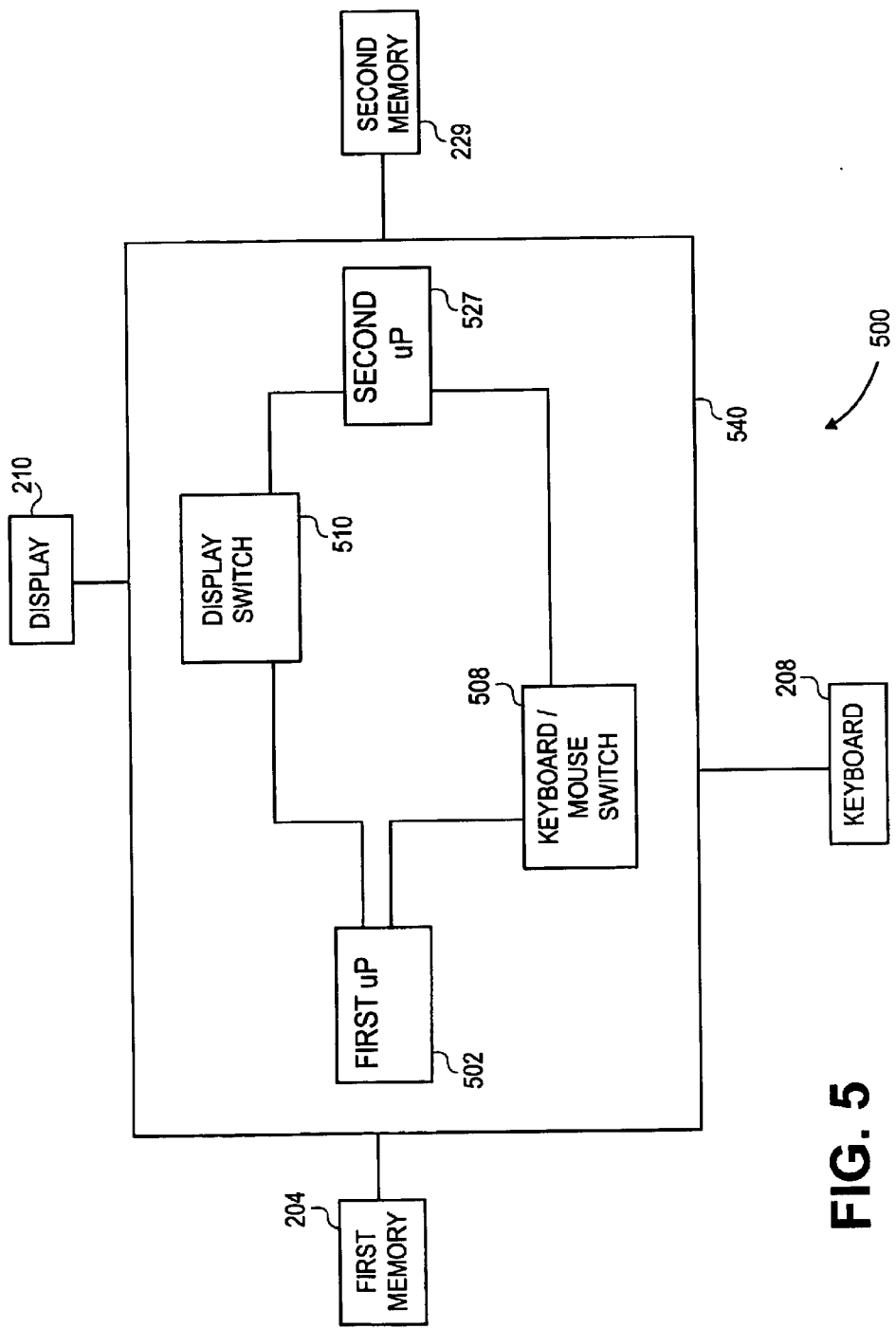
FIG. 5 is a block diagram illustrating an integrated circuit (IC) implementation of a dual form computing device according to one embodiment of the of the present invention.

In another embodiment, selected ones of functional components from both add-on card 305 and laptop computer 300 are incorporated into one integrated circuit. FIG. 5 is a block diagram illustrating an integrated circuit (IC) implementation of a dual form computing device according to one embodiment of the of the present invention. Referring to FIG. 5, dual form computing device 500 includes IC 540, first memory 204, second memory 229, display device 210 and keyboard 206, all of which, except for IC 540, were previously described above with respect to FIGS. 2–4.

IC 540 represents an integrated circuit manufactured according to methods known in the art, and includes first microprocessor 502, second microprocessor 527, display switch 510, and keyboard/mouse switch 508. First microprocessor 502 and second microprocessor 527 represent processors known in the art to process data. Display switch 510 represents a switch mechanism equipped to selectively route data from either first microprocessor 502 or second microprocessor 527 to external display device 210, whereas keyboard/mouse switch 508 represents a switch mechanism equipped to selectively route data from either first microprocessor 502 or second microprocessor 527 to external keyboard 208. It should be apparent to one skilled in the art that IC 540 ard/or dual form computing device 500 may contain additional components without parting from the spirit and scope of the invention.

Figure 6:
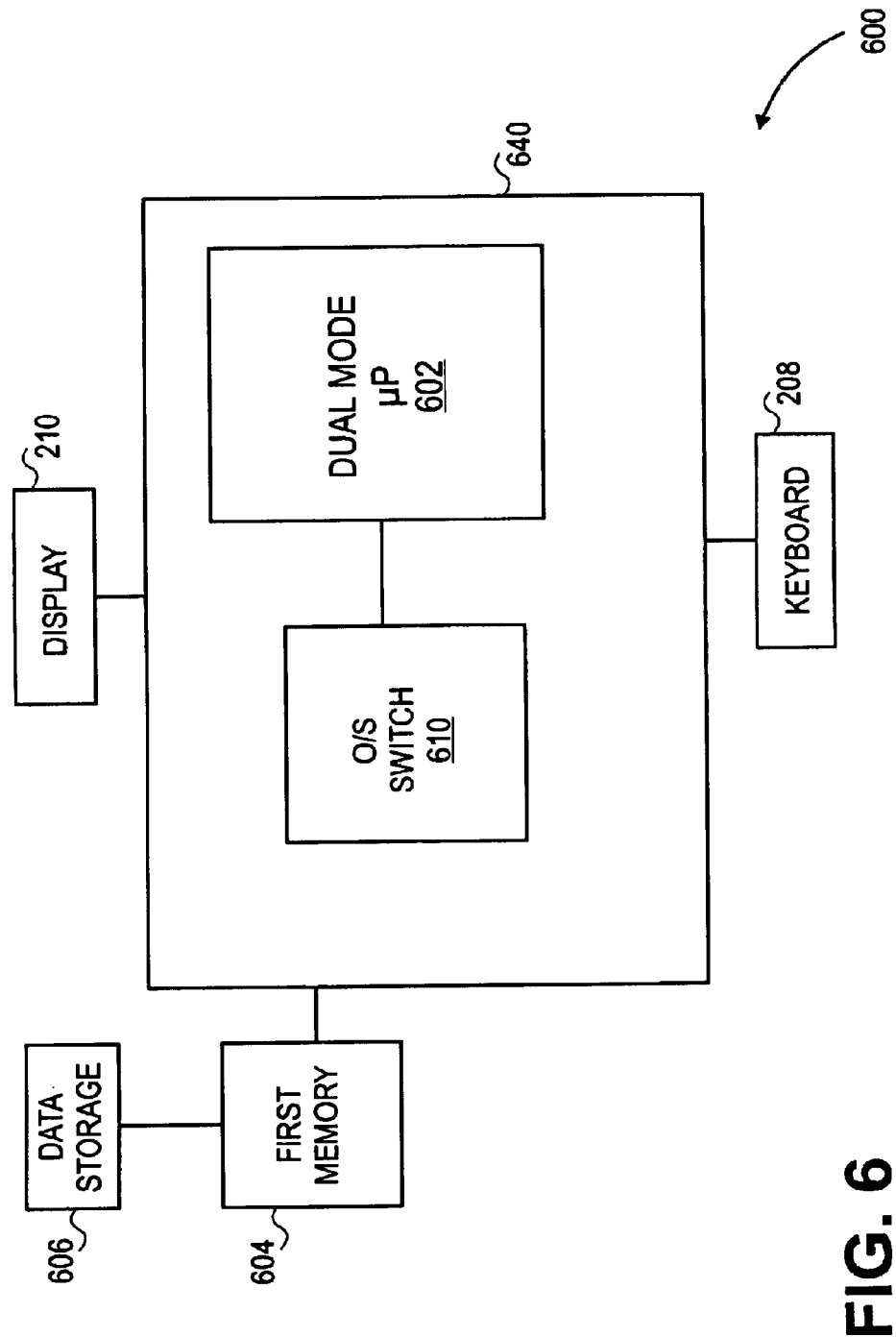
FIG. 6 is a block diagram illustrating one embodiment of the dual form computing device of the present invention including a single, dual mode microprocessor.

In yet another embodiment, rather than the dual form computing device of the present invention utilizing two separate microprocessors, a single, dual mode microprocessor solution may also be implemented. In such an embodiment, a microprocessor having at least two operating modes is utilized in place of two separate microprocessors. FIG. 6 is a block diagram illustrating one embodiment of the dual form computing device of the present invention including a single, dual mode microprocessor. Referring to FIG. 6, dual form computing device 600 is shown including IC 640, data storage device 606, and first memory device 604, as well as display device 210 and keyboard 208 (both previously described). Data storage device 606 represents a non-volatile data storage device known in the art, whereas first memory device 604 represents a read only memory and/or random access memory device, however, power is provided to at least a subset of the memory banks of memory 604, sufficient to hold a "reduced function" operating system.

IC 640 is an integrated circuit manufactured according to methods known in the art, IC 640 comprises dual mode microprocessor 602 and O/S switch 610. Dual mode microprocessor 602 represents a general purpose microprocessor having a first high performance mode, whereby the microprocessor operates at high frequency and voltage levels, and having a second low power mode, whereby the microprocessor operates at frequency and voltage levels lower than that of the first high performance mode, thereby consuming less power. O/S switch 610 represents a switching mechanism through which dual mode microprocessor 602 selectively accesses instructions residing within memory device 604 depending upon the operational mode of dual mode microprocessor 602. In one embodiment, O/S switch 610 represents logic equipped to select one or more ranges of memory addresses within first memory device 604. More specifically, a range that is typically powered for instant on mode of operation and a range that is powered on demand for non-instant on mode of operation.

In one embodiment, when dual mode microprocessor 602 operates in a high performance mode, dual mode microprocessor 632 executes instructions representing a first full-featured, large overhead operating system residing in the not always powered portion of first memory device 604. When dual mode microprocessor 602 operates in a low power mode, however, dual mode microprocessor 602 executes instructions representing a second, reduced function or streamlined operating system residing in the typically powered portion of memory device 604. Even though this portion of memory device 604 is typically powered, power consumption may actually be reduced by the reduced size and complexity of the operating system executed by dual mode microprocessor 602.

In one embodiment, instructions representing the first operating system are loaded from data storage device 606 into first memory device 604 to be executed by dual mode microprocessor 602, whereas in another embodiment, instructions representing the second operating system reside in first memory device 604 and are executed in place by dual mode microprocessor 602. In an alternative embodiment, instructions representing the first or second operating systems may reside in a second memory device powered in a like manner. In one embodiment, the first operating system comprises Microsoft WINDOWS-98, and the second operating system comprises Microsoft WINDOWS CE.

Figure 7:
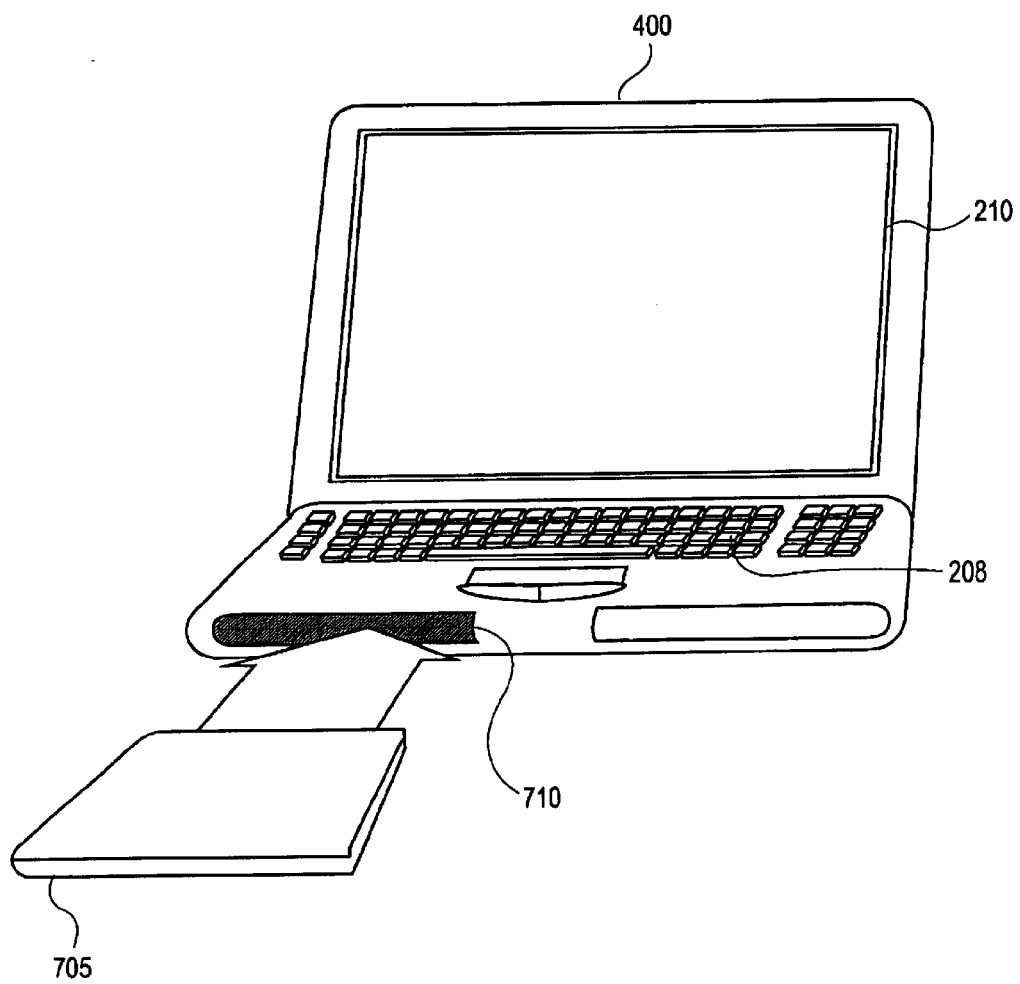
FIG. 7 is a schematic, pictorial illustration showing insertion of a hand-held computer into a receptacle in a laptop computer, according to one embodiment of the present invention.
Figure 8:
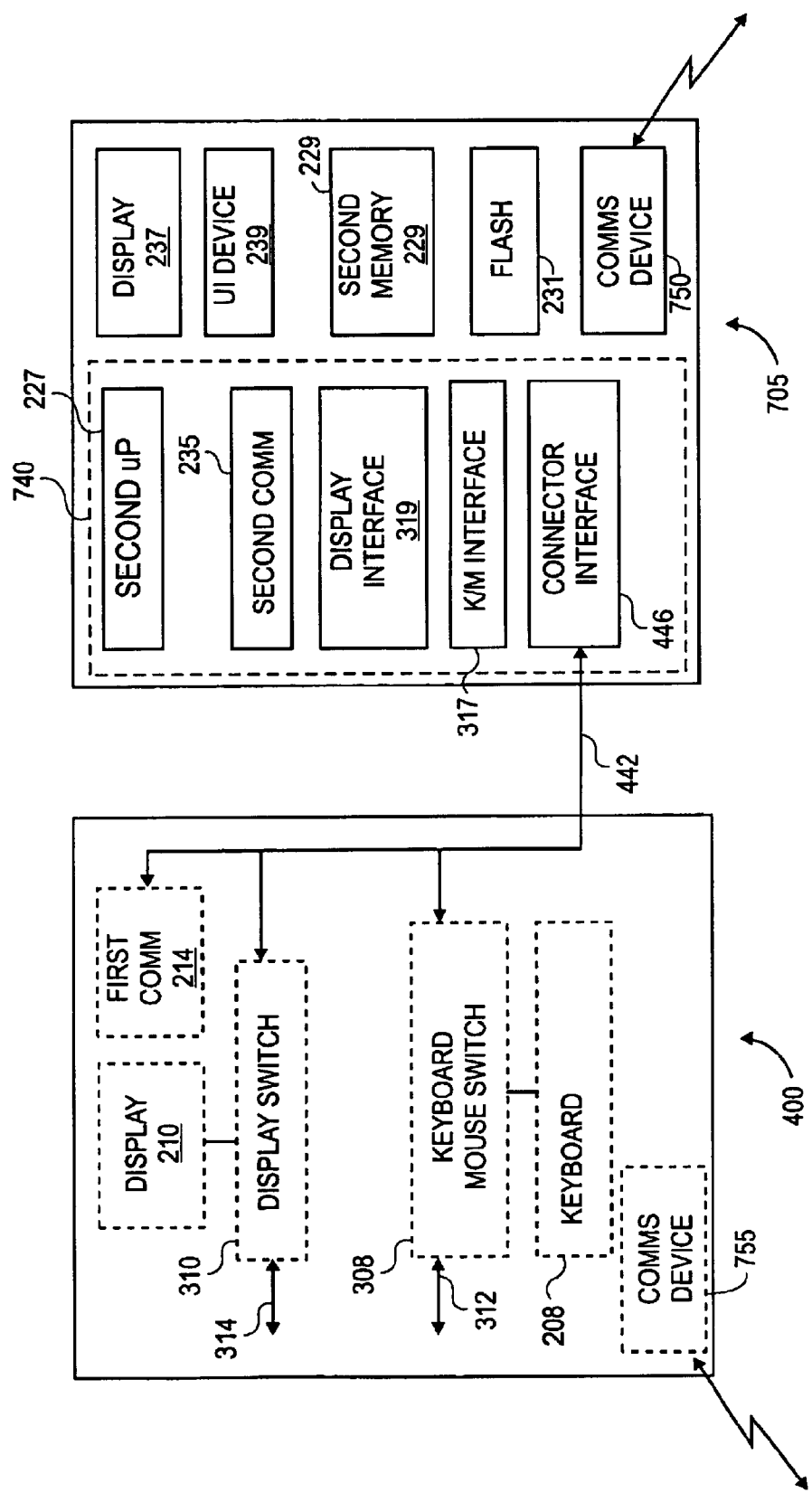
FIG. 8 is a block diagram illustrating implementation of the embodiment of FIG. 7.

FIGS. 7 and 8 show an embodiment of the present invention in which a hand-held computing device 705, such as a palm-top computer, is used together with laptop computer 400 to afford both instant on and high-performance, non-instant on operation. Laptop computer 400 has a receptacle 710 for receiving hand-held computing device 705. As long as the hand-held device is not inserted into the receptacle, however, the laptop computer and the hand-held device operate substantially independently of one another, like the conventional commuter 100 and handheld device 125 of FIG. 1. In this separated configuration, the hand-held device operates autonomously, by means of its own display 237 and user interface device 239, running any suitable operating system, such as Windows CE, PalmOS or EPOC, for example.

When hand-held device 705 is inserted into receptacle 710, connector 442 in the receptacle mates with connector interface 446 of the hand-held device. In this configuration, laptop computer 400 operates in a manner substantially similar to that described hereinabove with reference to FIG. 4, wherein add-on card 405 enables computer 400 to operate in either the instant on or non-instant on, high-performance rode. In the instant on mode, display switch 310 and keyboard/mouse switch 308 enable low-power microprocessor 227 in hand-held device 705 to access display 210, keyboard 20B and other resources of laptop computer 400, while the main microprocessor of the laptop computer is substantially shut down. Display 237 and user interface device 239 are typically inactive in this rode. In the non-instant on mode, hand-held device 705 and its microprocessor 227 are largely dormant, while the laptop runs under the control of its own main microprocessor. While the laptop computer runs in this latter, high-performance mode, data stored in memory 229 of the hand-held device are updated as required to maintain synchronization with corresponding data stored in the laptop computer.

Optionally, when hand-held device 705 is operating autonomously, outside receptacle 710, it communicates with laptop computer 400 by means of suitable communication devices 750 and 755 in the hand-held device and laptop computer, respectively. Such communication enables data synchronization to be maintained between the hand-held device and the laptop computer. In one embodiment, devices 750 and 755 comprise wireless communication devices, such as infrared ports for short-range communications, or radio-frequency devices, which may be adapted either for short-range communications directly between the hand-held device and the laptop computer, or for long-range communications, via a cellular network, for example. In another embodiment, one or both of devices 750 and 755 comprise modems, which are coupled via wire to a communications network, such as a telephone or data network. Alternatively, any other suitable communications interface known in the art may be used.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. An apparatus comprising:
   a first plurality of electronic components defining an instant on computing device for use in a first instant on mode of operation wherein said first plurality of electronic components execute a first startup sequence upon selection of said first instant on mode of operation;
   a second plurality of electronic components, including a plurality of input and output devices defining a non-instant on computing device for use in a second non-instant on mode of operation wherein said second plurality of electronic components execute a second startup sequence upon selection of said second non-instant on mode of operation, said first startup sequence being inhibited from execution upon said selection of said second non-instant on mode of operation; and
   one or more switching mechanisms coupled to said input and output devices and selectively, to selected ones of said first and second plurality of electronic components to enable said input/output devices to be available for use in said first instant on as well as said second non-instant on mode of operation.

2. The apparatus of claim 1 wherein said second startup sequence is inhibited from execution upon said selection of said first instant on mode of operation.

3. A system comprising:
   an integrated circuit comprising a first plurality of electronic components and defining a first instant on mode of operation wherein said first plurality of electronic components execute a first startup sequence upon selection of said first instant on mode of operation;
   a second plurality of electronic components, including a plurality of input and output devices, said second plurality of electronic components defining a second non-instant on mode of operation wherein said second plurality of electronic components execute a second startup sequence upon selection of said second non-instant on mode of operation, said first startup sequence being inhibited from execution upon said selection of said second non-instant on mode of operation; and
   one or more switching mechanisms coupled to said input and output devices and selectively, to selected ones of said first and second plurality of electronic components to enable said input and output devices to be available for use in said first instant on as well as said second non-instant on mode of operation.

4. The system of claim 3 wherein said second startup sequence is inhibited from execution upon said selection of said first instant on mode of operation.

5. An apparatus comprising:
   a memory device having a plurality of memory banks;
   a first operating system residing in a first range of said plurality of memory banks;
   a second operating system residing in a second range of said plurality of memory banks; a dual mode processor having at least two operational modes including:
   a first high performance mode, and
   a second low power mode; and
   logic equipped to selectively provide said dual mode processor with said first or second operating system in response to said operational mode of said dual mode processor.

6. A dual-mode portable computer, comprising:
   a first microprocessor, said first microprocessor executing a first startup sequence upon selection of a first instant on mode of operation;
   input and output devices;
   a connector, configured to receive a plug-in device that includes a second microprocessor, said second microprocessor executing a second startup sequence upon selection of a second non-instant on mode of operation wherein said first startup sequence is inhibited from being executed upon said selection of said non-instant on mode of operation and wherein said second startup sequence is inhibited from execution upon said selection of said first instant on mode of operation; and
   switching circuitry, adapted to selectively couple the input and output devices to the first microprocessor in a first mode of operation of the computer or, alternatively, to the second microprocessor in a second mode of operation of the computer when the plug-in device is connected to the connector.

7. An apparatus comprising:
   a first plurality of electronic components defining an instant on computing device for use in a first instant on mode of operation wherein said first plurality of electronic components execute a first startup sequence upon selection of said first instant on mode of operation;

a second plurality of electronic components, including a plurality of input and output devices defining a non-instant on computing device for use in a second non-instant on mode of operation wherein said second plurality of electronic components execute a second startup sequence upon selection of said second non-instant on mode of operation, said second startup sequence being inhibited from execution upon said selection of said first instant on mode of operation; and one or more switching mechanisms coupled to said input and output devices and selectively, to selected ones of said first and second plurality of electronic components to enable said input/output devices to be available for use in said first instant on as well as said second non-instant on mode of operation.

8. A system comprising:

an integrated circuit comprising a first plurality of electronic components and defining a first instant on mode of operation wherein said first plurality of electronic components execute a first startup sequence upon selection of said first instant on mode of operation;

a second plurality of electronic components, including a plurality of input and output devices, said second plurality of electronic components defining a second non-instant On mode of operation wherein said second plurality of electronic components execute a second startup sequence upon selection of said second non-instant on mode of operation, said second startup sequence being inhibited from execution upon said selection of said first instant on mode of operation; and one or more switching mechanisms coupled to said input and output devices and selectively, to selected ones of said first and second plurality of electronic components to enable said input and output devices to be available for use in said first instant on as well as said second non-instant on mode of operation.

* * * * *